May 4, 1965 R. G. HERB 3,181,775
PUMPING APPARATUS
Filed March 20, 1962
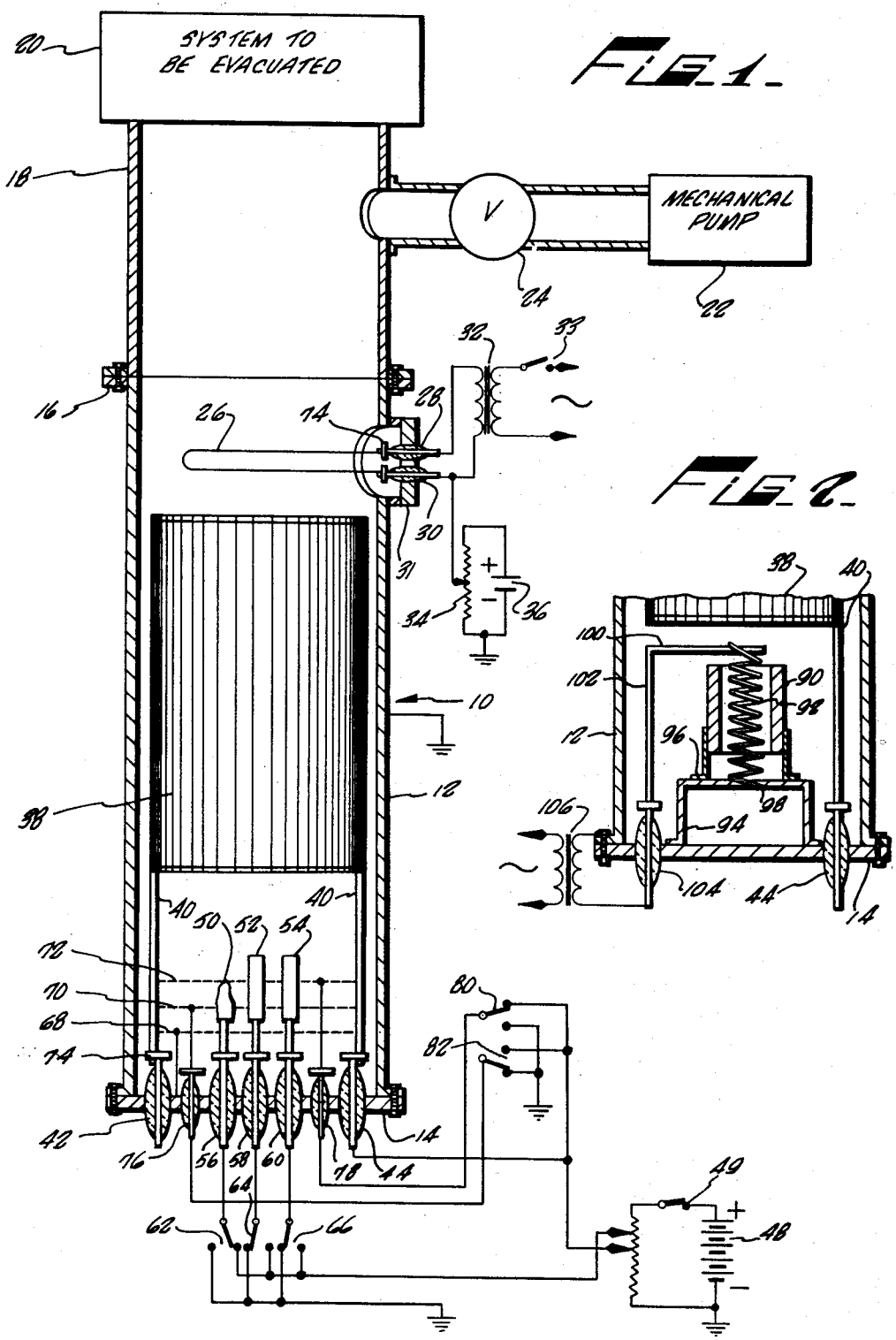

United States Patent Office 3,181,775
Patented May 4, 1965

3,181,775
PUMPING APPARATUS
Raymond G. Herb, Madison, Wis., assignor to Wisconsin Alumni Research Foundation, Madison, Wis., a corporation of Wisconsin not for private profit
Filed Mar. 20, 1962, Ser. No. 180,954
13 Claims. (Cl. 230—69)

This invention relates to an improved evaporator for use in vacuum pumps and the like.

My Patent No. 2,850,225 describes an improved vacuum pump for producing very high vacuums. The pump described in this patent operates by ionizing the gas molecules in the vacuum region and driving the ions into the walls of the pump chamber. A gettering substance, such as titanium, is evaporated in the pump chamber and condenses on the interior surfaces. The gettering substance combines either chemically or physically or both with the ionized gas molecules, thus removing the gas molecules from the evacuated region. An active surface of gettering material is provided by continuous or intermittent evaporation and condensation of the gettering substance. The continued evaporation of the gettering substance buries the ions which are driven into it so that the ions are permanently trapped and buried.

While the pump described in the above patent has proved to be a very effective high vacuum pump, efforts have been made to improve the capacity of the pump, the pumping speed, the length of time the pump can be operated continuously, and to lower the ultimate pressure produced by the pump. Some of these developments are shown in my Patents 2,888,189, 2,913,167 and 2,967,223.

The present invention provides an evaporator for a vacuum pump or the like in which material to be evaporated is vaporized in the pump chamber by sublimation. Gettering material may be heated to sublimation temperature in various ways. However, the preferred heating arrangements are by electron bombardment from a distributed source, or by radiant heat. Electron bombardment may be effected either with electrons derived directly from a heated filament or with electrons derived from the ionization space in the pump chamber. Radiant heat may be provided by a heated filament located adjacent the getter material. Such gettering arrangement require no moving parts for feeding the gettering material, and hence very little maintenance is required.

Large capacity may be achieved by employing a number of pieces of gettering material located within the pump chamber and connected to be consumed successively. By maintaining the temperature of the gettering material below the melting point, the liquid phase of the gettering material is eliminated, thus avoiding problems of containing the liquid and preventing liquid flow of the gettering material. Also the need for special heat concentrating means for producing evaporation of the gettering material is eliminated. One of the most important features of pumps employing this gettering arrangement is the achievement of lower ultimate pressure than have been achieved with getter-ion pumps heretofore by a factor of at least 100.

These and other advantages of the present invention will become more apparent from the following detailed description taken in conjunction with the accompanying drawings, in which:

FIG. 1 is a schematic sectional view of an embodiment of the invention in which the getter material is heated to sublimation temperature by electron bombardment; and FIG. 2 is a schematic, fragmentary sectional view of an alternative evaporator in which the getter material is heated to sublimation temperature by radiant heat.

Referring to FIG. 1, the numeral 10 indicates the pump housing. The housing includes a cylindrical shell 12 closed at one end by an end wall 14. The other end of the housing is open and is provided with a flange 16 for coupling the pump to other apparatus. A conduit 18 is shown interconnecting the pump housing and the system or vessel 20 being evacuated. A mechanical forepump 22 is coupled to the system through a valve 24.

The inner diameter of the cylindrical shell 12 may be from one or two inches for pumps of small capacity to eighteen or twenty-four inches for pumps of large capacity. Diameters of ten or twelve inches are suitable for many requirements.

A heater filament 26 is located adjacent one end of the chamber in the housing 10. The filament may be of tungsten resistance wire or other suitable material which is heated by a flow of electric current therethrough to provide a substantial number of free electrons that can be withdrawn from the surface. The filament is supported by a pair of insulators 28 and 30 which may be conventional glass-to-metal seals located in a removable plate 31 secured to the cylindrical wall 12. The filament is connected to a source of electric power through a transformer 32 and a switch 33. The heater may be maintained at the same potential or at a slightly positive potential with respect to the walls of the housing 10 by any suitable source of potential, such as a potentiometer 34 connected across a battery or other potential source 36. The negative side of the battery 36 is grounded as is the pump housing 10.

A cylindrical anode grid 38 composed of fine wire is located in the chamber adjacent the filament. By way of example, the anode grid may be composed of tungsten wires having .002 inch diameter spaced about ¼ inch apart. The grid is concentric with and closely spaced from the inner wall of the pump chamber. The grid 38 is preferably enclosed at the ends to form a region within the chamber of the housing 10 which is completely enclosed with the grid. However, this specific arrangement of the grid and filament is not essential to the operation of the invention and the grid may be open at the ends and the filament may be located at either end of the grid or it may extend inside the grid cylinder.

The grid 38 is supported by a pair of rods 40 which are secured to a pair of binding posts 42 and 44 extending through the end wall 14. The binding posts are of conventional glass-to-metal seals to provide electrical insulation from the housing 10.

A positive potential is applied to the anode grid 38 relative to the housing 10 by connecting the binding post 44 to a potentiometer 46 across which a voltage is applied by a battery or other suitable potential source 48 through a switch 49. The negative end of the battery 48 is at ground potential and the grid 38 is maintained at a positive potential of the order of 200 to 600 volts with respect to the housing 10.

A plurality of rods indicated at 50, 52 and 54, composed of gettering material such as titanium, are located adjacent the end of the chamber in the housing 10. By way of example, the rods may be ⅛ to ¾ inch in diameter. The gettering rods are supported on molybdenum or tungsten supports 56, 58 and 60 which are electrically connected to the exterior of the pump through insulated connections extending through the end plate 14. The molybdenum or tungsten supports may extend part of the way into the rods of gettering material, or they may extend through-out the length of the rods of gettering material to provide maximum structural strength for the heated gettering material. The gettering rod 50 is electrically connected either to ground potential or to a high positive potential derived from the potentiometer 46 by a two-pole switch 62. Similarly the gettering rods 52 and 54 are connected selectively to ground or the positive potential by two pole switches 64 and 66. A positive potential of the order of 1200 to 3000 volts may be applied to selected gettering rods by the switches.

The gettering rods project through several parallel grids, such as indicated at 68, 70 and 72 extending across the end of the chamber formed by the housing 10. Preferably the grid 68 is electrically connected to ground and serves as a barrier to electrons to prevent bombardment of support structure at the potential of grid 38 or at evaporator rod potential. Shielding disks 74 may be mounted on each insulator or binding post so as to prevent titanium from condensing onto the insulators or binding posts. The grids 70 and 72 are electrically connected to binding posts 76 and 78 extending through the end plate 14. External electrical connections are made from the binding posts 76 and 78 to a pair of double-pole switches 80 and 82 respectively. The switches provide electrical connections either to ground potential or to the same potential as the anode grid 38.

In operation, the pressure inside the pumping chamber is first reduced with the mechanical pump 22 to a pressure at which the filament 26 can operate without overheating. Then the valve 24 is closed and electric power is applied to the filament and other electrodes in the pumping chamber.

Electrons are drawn from the filament 26 into the space enclosed by the anode grid 38 by the positive potential existing between the anode grid 38 and the filament 26. The electrons enter the region enclosed by the anode grid 38 at sufficiently high energies to ionize gas molecules present. A low density plasma is produced in the region surrounded by the grid 38 having positive ion densities of the order of $1 \times 10^8$ ions per cubic centimeter with an equal density of electrons. The positive ions are driven to the side walls of the housing 10 because of the negative potential of the walls in relation to the anode grid 38. By virtue of the high positive potential applied to a selected one of the gettering rods, electrons are attracted to the gettering rod from the ionization region enclosed by or adjacent the anode grid 38. FIG. 1 shows gettering rod 50 connected to the high potential so that it is heated to sublimation temperature.

It is desirable that the electrons for bombarding the gettering rods be attracted from a widely distributed source so as to avoid overheating small areas of a gettering rod and thereby avoid the possibility of melting part of the rod, and so that a number of rods can be heated in succession from the same electron source as they are consumed. The electrons in the ionization space enclosed by the anode grid provide such a source.

Electron flow to the gettering rod is controlled by the voltage applied to the gettering rod, and this is adjusted to heat the gettering rod to temperatures of 200° to 300° C. below the melting point of the gettering rod. The melting temperature for titanium is 1945° K., and at temperatures 200° to 300° below the melting point the vapor pressure of the titanium is of the order of $10^{-4}$ to $10^{-5}$ mm. of Hg. At these temperatures, the vapor pressure of the titanium is sufficiently high that a substantial sublimation rate of the titanium is achieved. By connecting the rods successively to the positive potential source by means of switches 62, 64 and 66, the rods can be consumed one by one. A large number of titanium rods can be employed, giving the pump a large pumping capacity for a long period of time, with modest power requirements. For example, approximately 50 watts of power is required for the gettering rod circuit for a ⅛ inch rod, and approximately 500 watts is required for a ¾ inch rod.

The grids 70 and 72 provide a means for restricting electron bombardment to a limited portion of a rod. With a grid at ground potential, it effectively shields the portion of the rod behind the grid from exposure to electron bombardment. When the gettering material of the rod has been consumed to the first grid 72, this grid can be connected to the same potential as the grid 38, permitting the electrons to penetrate the grid and bombard the portion of the rod extending between the grids 70 and 72. By later connecting the grid 72 to a positive potential, the rod can be consumed by sublimation back to the shielding grid 68. This permits the gettering rod to be consumed from one end, thus limiting the area of the rod from which sublimation takes place and maintaining the area substantially constant as the gettering rod is consumed so as to provide uniform deposition of gettering material on the walls of the pumping chamber.

FIG. 1 illustrates the evaporation of the rod 50, with the grid 72 connected to high potential and the grid 70 connected to ground, so that the portion of the rod 50 which extends beyond the grid 70 is being evaporated.

Satisfactory results have been obtained without the use of grids, such as the grids 70 and 72, to restrict the area of the gettering rod which is bombarded by electrons. With such arrangements the entire rod, or most of it, is heated to sublimation temperature.

Small pieces of gettering material can be heated to sublimation temperature more readily than large pieces. For fast starting operation a small piece of gettering material may be heated to sublimation temperature, with the gettering operation being transferred to a larger piece of gettering material after the pump is in full operation so that the small piece may be turned off in order to conserve it.

FIG. 2 shows how an evaporator employing radiant heat to heat the gettering material to sublimation temperature may be employed in the pump structure of FIG. 1.

The gettering material 90 is a tube of open cylindrical shape, and a filament 92 of cylindrical shape extends through the center of the gettering material. The gettering material and the filament are mounted on a metallic support 94 having upwardly extending arms 96 to hold the gettering material in place. The filament is grounded at one end to the support 94 at 98. The other end of the filament is connected to an arm 100 which is connected through rod 102 extending through an insulating bushing 104 to the exterior of the pump. A transformer 106 connected between the rod 102 and the pump housing provides electrical power for heating the filament.

By way of example, the getter material 90 may be a titanium tube, the supports 94, 96 and 100 may be .01 inch tantalum strips, and the filament 92 may be tungsten wire.

Some typical sizes are as follows:

Titanium tube O.D., ½″, I.D., ⅜″, length, 1″
Tungsten filament O.D., ¼″, wire diameter 0.020″, coil length 1½″
Titanium tube O.D., ⅝″, I.D., ⅜″, length, 1″
Tungsten filament O.D., ¼″, wire diameter 0.020″, coil length 1½″
Titanium tube O.D., 5⁄16″, I.D., ¼″, length ⅜″
Tungsten filament O.D., 3⁄16″, coil length ⅝″, wire diameter 0.020″.

The filament 92 should be heated to approximately 2500° K. in order to heat titanium getter to sublimation temperature by radiation.

The evaporators of FIGS. 1 and 2 may be employed to evaporate materials other than for gettering. For example, these evaporators may be employed to evaporate magnetic material to provide thin films of electrical circuitry, and these evaporators may be employed to evaporate aluminum to provide a thin electrical conductor or a thin decorative covering.

The gettering material may be in substantially any shape or form as long as it can be heated to sublimation temperature by electron bombardment as illustrated in FIG. 1, by radiant heat as illustrated in FIG. 2, or by any other suitable heating arrangement.

What is claimed is:

1. A vacuum pump comprising a metal housing having a chamber therein and an input port for connecting the chamber with a vessel to be evacuated, a heater filament positioned in the chamber, a grid extending around the sides of the chamber but spaced therefrom, the grid surrounding a large region within the chamber, means for applying a large positive potential on the grid relative to the filament for drawing electrons into the region surrounded by the grid to ionize the gas therein by electron bombardment and thereby produce a low density plasma and a substantially equal density of electrons, a piece of gettering metal located in the chamber, and means applying a positive potential to the piece of gettering metal relative to the grid for providing a flow of electrons from the region surrounded by the grid to the piece of gettering metal to heat the gettering metal to a temperature sufficiently high to produce sublimation thereof but below the melting point of the gettering metal.

2. A vacuum pump comprising a metal housing having a chamber therein and an input port for connecting the chamber with a vessel to be evacuated, a heater filament located in the chamber, a grid extending around the sides of the chamber but spaced therefrom, the grid surrounding a large region within the chamber, means for applying a large positive potential to the grid relative to the filament for drawing electrons into the region surrounded by the grid to ionize the gas therein and thereby produce a low density plasma and a substantially equal density of electrons, a rod of gettering metal located in the chamber, and means for applying a positive potential to the gettering rod relative to the grid for providing a flow of electrons from the region surrounded by the grid to the gettering rod, the potential difference being such that the rod is heated by electron bombardment to a temperature sufficiently high to produce sublimation of the gettering metal but slightly below the melting point of the gettering metal.

3. Apparatus for producing a high vacuum in a vessel or the like that is partially evacuated by auxiliary pumping means, said apparatus comprising a housing having a closed chamber, at least a portion of the walls of the chamber being electrically conductive, means intercoupling the chamber and the vessel to be evacuated, a heater filament mounted in the chamber, the heater being electrically insulated from the conductive portion of the chamber walls, an anode grid positioned in the chamber and enclosing a substantial portion of the space in the chamber, a portion of said anode grid being parallel to and closely spaced from the conductive portion of the chamber walls, the anode grid being electrically insulated from the conductive portion of the chamber walls, means for maintaining a positive potential on the said anode grid relative to the conductive portion of the chamber walls, a plurality of pieces of solid gettering material positioned in the chamber, at least one shielding grid, the pieces of gettering material extending through the shielding grid, and means for selectively applying a positive potential to one of the pieces of gettering material relative to said anode grid and electrically connecting the other pieces of gettering material to the conductive portion of the chamber walls.

4. Pumping apparatus comprising a housing defining a chamber, at least a portion of the walls of the chamber being electrically conductive, a heater filament mounted in the chamber, the heater filament being electrically insulated from the conductive portion of the chamber walls, an anode grid positioned in the chamber and enclosing a substantial portion of the space in the chamber, a portion of said grid being parallel to and closely spaced from the conductive portion of the chamber walls, the grid being electrically insulated from the conductive portion of the chamber walls, means for applying a positive potenital to said anode grid relative to the conductive portion of the chamber walls, a plurality of rods of solid gettering material located in the chamber, at least one shielding grid, the rods extending through the shielding grid, means for selectively applying a positive potential to one of the rods relative to said anode grid and electrically connecting the other rods to the conductive portion of the chamber walls, and means for selectively connecting the shielding grid to either the same potential as the anode grid or to the same potential as the conductive portion of the chamber walls to selectively control the amount of the rod which is subjected to bombardment by the electrons inside the chamber.

5. Apparatus for producing a high vacuum in a vessel or the like that is partially evacuated by auxiliary pumping means, said apparatus comprising a housing having a closed chamber, at least a portion of the walls of the chamber being electrically conductive, means for providing a fluid connection between the chamber and the vessel, a heater filament mounted in the chamber, the heater being electrically insulated from the conductive portion of the chamber walls, an electrical grid positioned in the chamber and enclosing a substantial portion of the space in the chamber, a portion of said grid being parallel to and closely spaced from the conductive portion of the chamber walls, the grid being electrically insulated from the conductive portion of the chamber walls, means for maintaining a positive potential on said electrical grid relative to the conductive portion of the chamber walls, a plurality of rods of solid gettering material located in the chamber, a plurality of parallel grids, the rods extending through the parallel grids, means for selectively applying a positive potential to one of the rods relative to said electrical grid and electrically connecting the other rods to the conductive portion of the chamber walls, and means for selectively connecting one or more of the parallel grids to the same potential as said electrical grid.

6. Apparatus for producing a high vacuum in a vessel or the like that is partially evacuated by auxiliary pumping means, said apparatus comprising a housing having a closed chamber, at least a portion of the walls of the chamber being electrically conductive, means for providing a fluid connection between the chamber and the vessel, a heater filament mounted in the chamber, the heater being electrically insulated from the conductive portion of the chamber walls, an electrical grid positioned in the chamber and enclosing a substantial portion of the space in the chamber, a portion of said grid being parallel to and closely spaced from the conductive portion of the chamber walls, the grid being electrically insulated from the conductive portion of the chamber walls, means for maintaining a positive potential on said electrical grid relative to the conductive portion of the chamber walls, a plurality of rods of solid gettering material located in the chamber on the opposite side of the grid enclosed space from the heater filament, a plurality of parallel grids, the rods extending through the parallel grids, means for selectively applying a positive potential to one of the rods relative to said electrical grid and electrically connecting the other rods to the conductive portion of the chamber walls, and means for selectively connecting one or more of the parallel grids to the same potential as said electrical grid.

7. Apparatus as defined in claim 6 wherein the positive potential on the one rod is proportioned to attract electrons from the region enclosed by said electrical grid at a rate to heat the rod to a temperature slightly below the melting point of the gettering material, whereby the gettering material is vaporized by sublimation and deposits on the conductive portion of the chamber walls.

8. Pumping apparatus, comprising a housing defining a chamber, at least a portion of the walls of the chamber being electrically conductive, an electron emitter mounted in the chamber, an anode positioned in the chamber for accelerating electrons from said emitter, means for applying a positive potential to said anode relative to the conductive portion of the chamber walls, a piece of solid gettering material located in said chamber, at least one shielding grid in said chamber, said piece of gettering material extending through said shielding grid, means for applying a positive potential to said piece of gettering material to produce electron bombardment thereof for continuously heating the gettering material, and means for selectively changing the potential of the shielding grid to control the amount of said piece of gettering material which is subjected to electron bombardment.

9. Pumping apparatus, comprising a housing defining a chamber, at least a portion of the walls of the chamber being electrically conductive, an electron emitter mounted in the chamber, an anode positioned in the chamber for accelerating electrons from said emitter, means for applying a positive potential to said anode relative to the conductive portion of the chamber walls, a plurality of members of solid gettering material located in the chamber, and means for selectively applying a positive potential to any of said members for selectively producing electron bombardment thereof to heat any of said members.

10. Pumping apparatus, comprising a housing defining a chamber, at least a portion of the walls of said chamber being electrically conductive, an electron emitter mounted in said chamber, an anode grid positioned in said chamber and enclosing a substantial portion of the space therein, a portion of said grid being near the conductive portion of the chamber walls, means for applying a positive potential to said anode grid relative to the conductive portion of the chamber walls, a plurality of members of solid gettering material located in said chamber, and means for selectively applying a positive potential to each of said members to produce sustained heating thereof by electron bombardment.

11. Pumping apparatus, comprising a housing defining a chamber, at least a portion of the walls of said chamber being electrically conductive, an electron emitter mounted in said chamber, an anode grid positioned in said chamber and enclosing a substantial portion of the space therein, a portion of said grid being near the conductive portion of the chamber walls, means for applying a positive potential to said anode grid relative to the conductive portion of the chamber walls, a member of solid gettering material located in said chamber, means for applying a positive potential to said member to produce heating thereof by electron bombardment, at least one shielding grid in said chamber, said member extending through said shielding grid, and means for selectively changing the potential of said shielding grid between the potential of the conductive portion of said chamber walls and a high positive potential for controlling the amount of said member which is subjected to electron bombardment.

12. A vacuum pump, comprising means forming a chamber for receiving the gas to be pumped, said chamber having a colletcor surface therein, means for ionizing the gas in said chamber, means for producing an electric field in said chamber to drive the gas ions to said collector surface, a body of solid gettering material in said chamber, means for causing electron bombardment of said body of gettering material and thereby continuously heating the body of gettering material to a temperature sufficiently high to produce sublimation thereof but below the melting temperature of said material, so as to sublime the gettering material directly from the solid to the vapor state without passing through the liquid state, the vaporized gettering material being condensed in the solid state on said collector surface, and means for selectively producing an electric field adjacent said body of gettering material for repelling electrons from a portion of said body of gettering material to control the amount of said body which is heated by electron bombardment.

13. Pumping apparatus, comprising a housing defining a chamber, at least a portion of the walls of the chamber being electrically conductive, an electron emitter mounted in said chamber, an anode positioned in said chamber for accelerating electrons from said emitter, means for applying a positive potential to said anode relative to the conductive portion of the chamber walls, a member of solid gettering material located in said chamber, means for applying a positive potential to said member of gettering material to produce electron bombardment thereof for continuously heating the gettering material, and means for selectively producing an electric field adjacent said member of gettering material for diverting electrons from a portion of said member to control the amount of said member which is subjected to electron bombardment.

References Cited by the Examiner

UNITED STATES PATENTS

| | | | |
|---|---|---|---|
| 2,727,167 | 12/55 | Alpert. | |
| 2,796,555 | 6/57 | Connor. | |
| 2,850,225 | 9/58 | Herb | 230—69 |
| 2,858,972 | 11/58 | Gurewitsch | 230—69 |
| 2,888,189 | 5/59 | Herb | 230—69 |
| 2,925,214 | 2/60 | Gurewitsch | 230—69 |
| 2,948,607 | 8/60 | Wagener. | |
| 2,972,690 | 2/61 | McCoubrey. | |
| 2,988,657 | 6/61 | Klopfer et al. | |
| 3,018,193 | 1/62 | Eshner et al. | 117—107 |
| 3,074,621 | 1/63 | Lorenz et al. | 230—69 |
| 3,094,395 | 6/63 | Richardson. | |
| 3,121,155 | 2/64 | Berry | 230—69 X |
| 3,149,716 | 9/64 | Papacosta et al. | |

OTHER REFERENCES

Espe, Knoll and Wilder: Getter Materials for Electron Tubes, "Electronics," October 1950, pages 80–86.

Office of Technical Services publication No. 62–32475, H. 3V. 9 R.595 which is a translation of an article entitled "The Titanium Pump" in Russian publication Uks. fiz. Zhur. 1959, 4 (6), 750–754.

LAURENCE V. EFNER, *Primary Examiner.*

WARREN E. COLEMAN, *Examiner.*